United States Patent [19]

Semprevivo et al.

[11] 3,847,418

[45] Nov. 12, 1974

[54] PLASTIC PIPE SECTION WITH AN IMPROVED TAP-IN ARRANGEMENT

[75] Inventors: Ralph Semprevivo; Donald W. Andrews, both of Franklin; Richard L. Clark, Utica, all of Pa.; David W. French, Denison, Tex.

[73] Assignee: Johns-Manville Corporation, Greenwood Village, Colo.

[22] Filed: Dec. 1, 1972

[21] Appl. No.: 311,198

[52] U.S. Cl. ................................ 285/219, 285/423
[51] Int. Cl. ............................................ F16l 15/00
[58] Field of Search ........... 285/197, 199, 198, 200, 285/219, 423; 138/177

[56] References Cited
UNITED STATES PATENTS

| | | | |
|---|---|---|---|
| 1,336,423 | 4/1920 | Chadwick | 285/198 |
| 2,896,975 | 7/1959 | Wahl et al. | 285/219 |
| 3,695,643 | 10/1972 | Schmunk | 285/156 |

FOREIGN PATENTS OR APPLICATIONS

| | | | |
|---|---|---|---|
| 2,049,784 | 12/1971 | France | 285/200 |
| 506,067 | 12/1954 | Italy | 285/197 |

Primary Examiner—Dave W. Arola
Attorney, Agent, or Firm—John A. McKinney; Robert M. Krone; Stephen C. Shear

[57] ABSTRACT

A heat deformable plastic pipe section having an improved tap-in arrangement is disclosed herein along with a method of forming the same. The tap-in arrangement includes an outer zone defined by a substantially flat exterior surface and a substantially flat interior surface and an inner zone located within the outer zone and preferably having a curvilinear and more particularly a circular, periphery. Like the outer zone, the inner zone is defined by substantially flat exterior and interior surfaces which are inwardly indented with respect to the outer zone. In order to tap into the pipe section, that is, in order to provide fluid communication between the interior and exterior of the pipe section an open ended passage, preferably internally threaded, is provided through the flat surfaces of the inner zone.

3 Claims, 2 Drawing Figures

PATENTED NOV 12 1974  3,847,418

PLASTIC PIPE SECTION WITH AN IMPROVED TAP-IN ARRANGEMENT

BACKGROUND OF THE INVENTION

The present invention relates generally to tap-in arrangements for pipes and more particularly to a novel leak resistant tap-in arrangement for heat deformable plastic pipes.

Heretofore, most piping, and especially underground piping, has been constructed of cast iron and/or asbestos cement. Today, however, industry is going more and more to polyvinyl chloride or other such plastic piping which is generally more economical and lighter in weight than its predecessors.

In many pipe arrangements, there is, of course, a necessity to provide a tap-in from one pipe to another. However, prior to the advent of the instant invention, a standard plastic pipe could not be satisfactorily tapped directly but, in most cases, required a special wall thickness and/or a special bushing or a coupler made of another material such as cast iron or asbestos cement. One major reason for this drawback in standard plastic pipe resides in its shape and inherent weakness compared to cast iron and asbestos cement. For example, when an internally threaded tap-in passage is provided directly through the wall of a cylindrical plastic pipe of standard cross-sectional dimensions, the number of complete threads capable of being formed around the passage have been found, in many cases, to be insufficient in providing holding power for withstanding sustained internal pressure loads.

As will be seen hereinafter, the present invention overcomes the foregoing deficiencies by providing in the plastic pipe an integral flattened zone through which the threaded passage is provided. In this manner, full effect of the threads for holding power can be achieved since none of the threads become incomplete due to the curvature of the pipe. As will also be seen hereinafter, the present invention provides a specific flattened zone or configuration which actually initially decreases the size of the tap-in passage in response to internal pressure, thereby increasing resistance to leakage at the tap-in joint. More specifically, when a threaded connection is made into the tap-in passage and when the pipe is subjected to internal pressure, the flattened zone surrounding the passage tries to stress back to its original circumferential state, thereby squeezing the internal threads of the passage around the threaded connection for providing an increasingly tighter joint.

OBJECTS OF THE INVENTION

From the foregoing, an object of the present invention is to provide a plastic pipe with a novel tap-in arrangement.

Another object of the present invention is to provide a novel and uncomplicated tap-in arrangement which is an integral part of the plastic pipe and which is economical to make and reliable in use.

Still another object of the present invention is to provide a plastic pipe having a tap-in arrangement which increases in holding power in response to increased internal pressure within the pipe.

A further object of the present invention is to provide a novel method of making the tap-in arrangement in a heat deformable plastic pipe.

These and other objects and features of the present invention will become apparent from the following descriptions.

DETAILED DESCRIPTION

Figure 1:
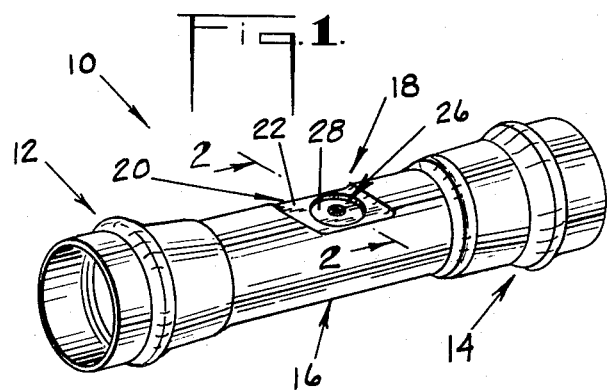
FIG. 1 is a perspective view of a section of plastic pipe, particularly a double bell coupling, which includes a tap-in arrangement constructed in accordance with the present invention.

Turning now to the drawing and specifically FIG. 1, a section of pipe and more particularly a double bell coupling 10 is illustrated. Coupling 10, which is constructed of polyvinyl chloride or other such heat deformable plastic material, includes opposite bell ends 12 and 14, each of which is adapted for connection with one end of an independent pipe segment, and a cylindrical straight section 16 joining the bell ends. In accordance with the present invention, a tapping arrangement 18 is integrally formed in one segment of straight section 16 and provided for tapping into coupling 10. As will be seen hereinafter, arrangement 18 is uncomplicated in design, easily formed in straight pipe section 16 and provides reliable means for tapping into the coupling. More specifically, tap-in arrangement 18 maximizes thread engagement with a tapping implement and provides increased tightening action in response to internal pressure within coupling 10, both of which increase leak and pull-out resistance.

Attention is now specifically directed to the tap-in arrangement which, as illustrated, includes an outer zone 20 comprising a portion of pipe section 16 having a substantially flat exterior surface 22 and a substantially flat interior surface 24. As shown best in FIG. 2, the wall thickness of outer zone 20 is preferably substantially uniform and substantially equal to the radial wall thickness of cylindrical pipe section 16. In addition, the extreme periphery of zone 20 is substantially rectangular in configuration. However, as will become apparent hereinafter, the configuration of zone 20 is not necessarily rectangular but will depend upon the shape of the tool utilized in forming it.

Tap-in arrangement 18 also includes an inner zone 26 located within and integrally formed with outer zone 20 and defined by a substantially flat exterior surface 28 and a substantially flat interior surface 30. As illustrated best in FIG. 2, the exterior surface 28 and the interior surface 30 of inner zone 26 are respectively inwardly recessed or indented with respect to exterior and interior surfaces 22 and 24 of outer zone 20. In addition, the wall thickness of inner zone 26 is preferably substantially uniform and substantially equal to the radial wall thickness of cylindrical pipe section 16.

Figure 2:
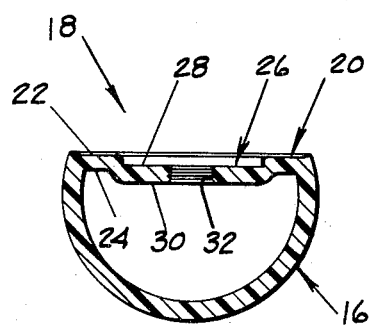
FIG. 2 is a cross sectional view of the double bell coupling of FIG. 1, taken generally along line 2—2 in FIG. 1.

As illustrated in FIG. 2, tap-in arrangement 18 also includes an internally threaded passage 32 which extends entirely through inner zone 26 from exterior surface 28 to interior surface 30. This internally threaded passage is, of course, adapted to receive and engage around an externally threaded component utilized for tapping into coupling 10, thereby providing fluid communication between the interior of the coupling and the exterior thereof.

As stated above and in accordance with the present invention, inner zone 26 is substantially flat as compared to the curvilinear (actually circular) cross-sectional configuration of undeformed cylindrical pipe section 16. Hence, a greater number of complete threads can be provided in passage 32 extending through zone 26 than could otherwise be provided in a passage extending through a curvilinear cross-section of equal thickness such as the curvilinear cross-section of undeformed pipe section 16. Therefore, by providing flattened zone 26, passage 32 provides more reliable engagement with a threaded connection than would otherwise be possible by providing the passage directly through the undeformed cylindrical pipe section.

In addition to the foregoing, because flattened zone 26 is indented inwardly, it tries to stress back to its initial circumferential origin in response to internal pipe pressure. In so doing, it must initially deform and at least partially move into passage 32 before otherwise expanding outwardly to its initial circumferential origin. During this initial deformation, passage 32 tends to contract or deform inwardly at least along some point or points about its periphery. Hence, when a threaded connection is made in the passage and when the pipe is subjected to internal pressure, the passage during contraction tends to squeeze the threaded connection, thereby providing an increasingly tighter leak-proof joint. In this regard, zone 26 is preferably defined by a closed curvilinear periphery and particularly a circular periphery. In this manner, passage 32 tends to contract uniformly for providing uniform squeezing action around the threaded connection.

As a further feature of tap-in arrangement 18, it should be noted that by inwardly indenting zone 26, the cross-sectional volume of the pipe section at this point slightly decreases. By physical laws, this decrease in cross-sectional volume increases the internal pressure at this point and achieves a desirable result of assuring that some of the fluid passing to this point is forced outwardly through passage 32.

With tap-in arrangement 18 constructed in the foregoing fashion, attention is now directed to the manner in which it is preferably integrally formed in a segment of a cylindrical pipe constructed of polyvinyl chloride or other such heat deformable plastic material. In this regard, it is to be understood that the tap-in arrangement is not limited to a double bell coupling or, for that matter, any other coupling. For example, tap-in arrangement 18 may be just as easily formed in any straight section of cylindrical pipe. However, since this is very difficult in the field, it is preferably preformed in a coupling member.

An initial step in forming arrangement 18 in a cylindrical pipe segment is to select the area of the pipe segment which will comprise the tap-in arrangement. This area, once selected, is heated to the state of thermoelastic deformability. This can be achieved in any suitable manner. For example, radiant heat can be utilized, in which case the selected area can be localized by masking off the surrounding area with aluminum foil or other reflective material.

After the selected area is heated to the state of thermoelastic deformability, it is deformed so as to define outer zone 20 and inner zone 26. Conventional equipment may be utilized to achieve this. In this regard, if the equipment used could satisfactorily produce indented inner zone 26 having flattened exterior and interior surfaces 28 and 30 without forming outer zone 20, the outer zone would not be necessary to the present invention. Hence, it is to be understood that the tap-in arrangement of the present invention does not require outer zone 20 so long as inner zone 26 can be satisfactorily formed in accordance with the foregoing description. After the inner and outer zones are formed, which is preferably done simultaneously, and after the selected area has cooled, internally threaded passage 32 is drilled or otherwise provided through the inner zone, thereby completing the tap-in arrangement.

From the foregoing, it should be readily apparent that integrally formed tap-in arrangement 18 provides improved thread holding power and a positive tightening feature, both of which increase leak resistance and pull-out resistance. It should be equally apparent that the tap-in arrangement is uncomplicated in design and may be readily formed in a heat deformable plastic pipe.

What is claimed is:

1. A plastic pipe section comprising:
    a. a hollow body portion having a curvilinear cross-section;
    b. a tap-in outer zone comprising an integral part of and integrally formed in said body portion and having a substantially flat exterior surface and a substantially flat interior surface;
    c. a tap-in inner zone surrounded by and integrally formed with said outer zone and defined by a curvilinear periphery, said inner zone being inwardly indented with respect to said interior and exterior surfaces of said outer zone and having substantially flat exterior and interior surfaces; and
    d. said tap-in inner zone including an internally threaded open ended passage extending therethrough, said passage providing fluid communication between the interior and exterior of said body portion.

2. A plastic pipe section according to claim 1 wherein said curvilinear periphery defining said inner zone is a substantially circular periphery.

3. A plastic pipe section according to claim 1 wherein the cross-sectional wall thicknesses of said outer zone, inner zone, and hollow body portion having a curvilinear cross section are substantially equal.

* * * * *